(12) United States Patent
Monden

(10) Patent No.: US 10,434,590 B2
(45) Date of Patent: Oct. 8, 2019

(54) SKIVING CUTTER

(71) Applicant: Mitsubishi Heavy Industries Machine Tool Co., Ltd., Ritto-shi, Shiga (JP)

(72) Inventor: Tetuji Monden, Ritto (JP)

(73) Assignee: MITSUBISHI HEAVY INDUSTRIES MACHINE TOOL CO., LTD., Ritto-Shi (JP)

( * ) Notice: Subject to any disclaimer, the term of this patent is extended or adjusted under 35 U.S.C. 154(b) by 0 days.

(21) Appl. No.: 15/769,504

(22) PCT Filed: Jul. 18, 2017

(86) PCT No.: PCT/JP2017/025958
§ 371 (c)(1),
(2) Date: Apr. 19, 2018

(87) PCT Pub. No.: WO2018/078964
PCT Pub. Date: May 3, 2018

(65) Prior Publication Data
US 2019/0076943 A1    Mar. 14, 2019

(30) Foreign Application Priority Data

Oct. 25, 2016 (JP) .................................. 2016-208537

(51) Int. Cl.
*B23F 5/00*        (2006.01)
*B23F 5/16*        (2006.01)
(Continued)

(52) U.S. Cl.
CPC ............ *B23F 5/163* (2013.01); *B23F 21/005* (2013.01); *B23F 21/10* (2013.01); *B23F 21/103* (2013.01);
(Continued)

(58) Field of Classification Search
CPC ...... B23F 21/24; B23F 21/245; B23F 21/005; B23F 21/103; B23F 21/10; B23F 21/16;
(Continued)

(56) References Cited

U.S. PATENT DOCUMENTS

| 5,494,475 A | * | 2/1996 | Basstein ................. B23F 15/06 407/28 |
| 5,720,584 A | * | 2/1998 | Sijtstra ................... B23F 15/06 407/20 |

(Continued)

FOREIGN PATENT DOCUMENTS

EP    2 792 442 A1    10/2014
EP    3 075 481 A1    10/2016
(Continued)

OTHER PUBLICATIONS

International Search Report and English translation (Form PCT/ISA/210) for Application No. PCT/JP2017/025958, dated Sep. 19, 2017.

*Primary Examiner* — Willmon Fridie, Jr.
(74) *Attorney, Agent, or Firm* — Birch, Stewart, Kolasch & Birch, LLP

(57) ABSTRACT

A skiving cutter includes a cutting edge portion in which a tooth trace extends in a direction inclined with respect to an axis of a base. The cutting edge portion is segmented into a plurality of segmented cutting edges by cutting edge grooves extending in a direction intersecting the tooth trace. One of the plurality of segmented cutting edges forms a reference cutting edge. Among the plurality of segmented cutting edges constituting the cutting edge portion, the reference cutting edge has the largest axis-cutting edge distance which is a distance from the axis to the outer circumferential cutting edge of the segmented cutting edge, and the remaining one or more segmented cutting edges have gradually smaller axis-cutting edge distances as a distance from the (Continued)

reference cutting edge to each of the remaining cutting edges increases. A helix angle is different according to positions of the plurality of segmented cutting edges.

11 Claims, 11 Drawing Sheets

(51) Int. Cl.
  *B23F 21/00* (2006.01)
  *B23F 21/10* (2006.01)
  *B23F 21/16* (2006.01)
  *B23F 19/00* (2006.01)
  *B23F 23/12* (2006.01)

(52) U.S. Cl.
  CPC ............ *B23F 21/16* (2013.01); *B23F 21/163* (2013.01); *B23F 19/002* (2013.01); *B23F 23/1206* (2013.01)

(58) Field of Classification Search
  CPC ........ B23F 5/163; B23F 13/00; B24B 19/022; B24B 19/075; B24B 19/085
  See application file for complete search history.

(56) References Cited

U.S. PATENT DOCUMENTS

| | | | |
|---|---|---|---|
| 6,217,409 B1* | 4/2001 | Stadtfeld | B23F 5/04 451/147 |
| 6,602,115 B2* | 8/2003 | Tan | B23F 23/1225 451/47 |
| 9,120,167 B2* | 9/2015 | Yanase | B23F 21/02 |
| 9,387,547 B2* | 7/2016 | Vogel | B23F 21/245 |
| 9,969,018 B2* | 5/2018 | Yanase | B23F 23/1218 |
| 10,252,361 B2* | 4/2019 | Kikuchi | B23F 5/163 |
| 2011/0269383 A1 | 11/2011 | Yanase et al. | |
| 2012/0252317 A1* | 10/2012 | Yanase | B23F 13/006 451/5 |
| 2014/0314504 A1 | 10/2014 | Vogel et al. | |
| 2016/0318110 A1 | 11/2016 | Kikuchi et al. | |
| 2017/0252843 A1* | 9/2017 | Matsubara | B23F 21/12 |

FOREIGN PATENT DOCUMENTS

| | | |
|---|---|---|
| JP | 44-29280 Y | 12/1969 |
| JP | 61-241021 A | 10/1986 |
| JP | 2010-149219 A | 7/2010 |
| JP | 2013-18117 A | 1/2013 |
| JP | 1505977 S | 9/2014 |
| JP | 1519201 S | 3/2015 |
| JP | 1519596 S | 3/2015 |
| JP | 1519597 S | 3/2015 |
| JP | 1519598 S | 3/2015 |
| JP | 5864035 B1 | 2/2016 |
| JP | 1549672 S | 5/2016 |
| JP | 1549673 S | 5/2016 |
| JP | 2016-124082 A | 7/2016 |
| WO | WO 2011/043358 A1 | 4/2011 |
| WO | WO 94/26452 A1 | 11/2014 |
| WO | WO 2016/054146 A1 | 4/2016 |
| WO | WO 2016/111172 A1 | 7/2016 |

* cited by examiner

SKIVING CUTTER

TECHNICAL FIELD

The present invention relates to a skiving cutter for manufacturing internal gears by skiving-processing internal gear materials.

Priority is claimed on Japanese Patent Application No. 2016-208537, filed Oct. 25, 2016, the content of which is incorporated herein by reference.

BACKGROUND ART

For example, a skiving cutter disclosed in the following Patent Literature 1 includes a base having a barrel shape or a truncated cone shape, and a plurality of cutting edge portions protruding from an outer circumferential surface of the base. Here, the truncated cone shape is a shape of a portion in which a cone is cut away at a plane parallel to a bottom surface and a side including the apex of the cone is removed. The plurality of cutting edge portions are separated from each other in a circumferential direction with respect to a central axis of the base. A tooth trace of each cutting edge portion extends in a direction inclined with respect to the central axis. In addition, a cutting edge portion is divided into a plurality of segmented cutting edges by cutting edge grooves extending in a direction intersecting the tooth trace.

CITATION LIST

Patent Literature

[Patent Literature 1]
Japanese Patent No. 5864035

SUMMARY OF INVENTION

Technical Problem

A manufacturer of internal gears requires precision processing of internal gears into target shapes and to prolong a service life of the cutter used for manufacturing internal gears.

Therefore, it is an object of the present invention to provide a skiving cutter capable of precisely forming an internal gear into a target shape and achieving a long service life for the skiving cutter.

Solution to Problem

A skiving cutter as a first aspect according to the invention for achieving the above-described object includes a base having a circular cross-sectional shape perpendicular to an axis, and a plurality of cutting edge portions protruding from an outer circumferential surface of the base, formed at intervals in a circumferential direction with respect to the axis, and having a tooth trace extending in a direction inclined with respect to the axis, in which each of the cutting edge portions is segmented into a plurality of segmented cutting edges by cutting edge grooves extending in a direction intersecting the tooth trace, each of the segmented cutting edges includes an outer circumferential cutting edge which is an edge farthest away from the base among portions forming the segmented cutting edge, one of the plurality of segmented cutting edges constituting the cutting edge portion forms a reference cutting edge, and the reference cutting edge has the largest axis-cutting edge distance which is a distance from the axis to the outer circumferential cutting edge and the remaining one or more segmented cutting edges have gradually smaller axis-cutting edge distances as a distance from the reference cutting edge to each of the remaining segmented cutting edges increases, and a helix angle which is an angle of the tooth trace with respect to the axis is different according to a position in the axial direction of the plurality of segmented cutting edges constituting the cutting edge portion.

Here, an internal gear in which the tooth trace is inclined with respect to a workpiece center axis and a helix angle of the tooth trace is constant at any position in a direction in which the workpiece center axis extends is assumed to be processed by the method of the skiving processing. In the skiving cutter, the reference cutting edge has the largest axis-cutting edge distance and the remaining one or more segmented cutting edges among the plurality of segmented cutting edges constituting the cutting edge portion have gradually smaller axis-cutting edge distances as a distance from the reference cutting edge to each of the remaining segmented cutting edges increases. Thus, in the skiving cutter, when a cutting edge groove of a workpiece is being cut by one cutting edge portion among the plurality of cutting edge portions, it is possible to prevent another cutting edge portion from cutting a region that is not supposed to be cut in the workpiece.

Also, in the skiving cutter, the helix angle which is an angle of the tooth trace with respect to the axis is different according to a position in the axial direction of the plurality of segmented cutting edges constituting the cutting edge portion. Therefore, in the skiving cutter, all the segmented cutting edges constituting the cutting edge portion can be positioned at accurate positions with respect to the tooth groove of the workpiece. Therefore, in the skiving cutter, it is possible to enhance processing accuracy for the workpiece. In addition, in the skiving cutter, since all the segmented cutting edges constituting the cutting edge portion can be positioned at accurate positions with respect to tooth grooves of the workpiece, a load applied to each of the segmented cutting edges constituting the cutting edge portion can be reduced and a service life of the skiving cutter can be prolonged.

Here, in the skiving cutter, helix angles of one or more segmented cutting edges excluding the reference cutting edge among the plurality of segmented cutting edges constituting the cutting edge portion may increase in variation amount with respect to the helix angle of the reference cutting edge as a distance from the reference cutting edge to each of the segmented cutting edges increases.

In the skiving cutter, all the segmented cutting edges constituting the cutting edge portion can be positioned at more accurate positions with respect to tooth grooves of the workpiece.

In addition, in any of the skiving cutters described above, helix angles of one or more segmented cutting edges excluding the reference cutting edge among the plurality of segmented cutting edges constituting the cutting edge portion may increase as a distance increases from the reference cutting edge to each of the segmented cutting edges.

In the skiving cutter, all the segmented cutting edges constituting the cutting edge portion can be positioned at more accurate positions with respect to tooth grooves of the workpiece.

In any of the skiving cutters described above, cutting edge heights of the plurality of segmented cutting edges constituting the cutting edge portion may be formed such that the cutting edge height at the reference cutting edge is the highest, and the cutting edge height at one segmented cutting edge which is more distant from the reference cutting edge between two segmented cutting edges adjacent to each other in a tooth trace direction in which the tooth trace extends is equal to or less than the cutting edge height of the other segmented cutting edge.

In the skiving cutter, an amount of wear on the plurality of segmented cutting edges constituting the cutting edge can be made uniform, and a service life of the skiving cutter can be prolonged.

In any of the skiving cutters described above, cutting edge widths of the plurality of segmented cutting edges constituting the cutting edge portion may be formed such that the cutting edge width at the reference cutting edge is the largest, and the cutting edge width at one segmented cutting edge which is more distant from the reference cutting edge between the two segmented cutting edges adjacent to each other in the tooth trace direction in which the tooth trace extends is equal to or less than the cutting edge width of the other segmented cutting edge.

In the skiving cutter, an amount of wear on the plurality of segmented cutting edges constituting the cutting edge portion can be made uniform, and a service life of the skiving cutter can be prolonged.

In any of the skiving cutters described above, the segmented cutting edges may include a cutting face extending from the outer circumferential cutting edge toward the base, a peripheral relief face extending from the outer circumferential cutting edge in a direction along the tooth trace, and a back face extending from an end opposite to the outer circumferential cutting edge on the peripheral relief face toward the base, and a rake angle which is an angle of the cutting face with respect to a virtual plane perpendicular to the tooth trace may be 0° or more and 20° or less.

In the skiving cutter, in contrast to a case in which the rake angle is less than 0°, the cutting load decreases and a wear amount of the cutting edge can be reduced. In addition, in the skiving cutter, in contrast to a case in which the rake angle exceeds 20°, strength of the cutting edge can be enhanced and a risk of causing chipping or the like can be reduced.

Further, in the skiving cutter having the back face, a back face angle which is an angle of the back face with respect to a virtual plane perpendicular to the tooth trace may be 10° or more and 50° or less.

In the skiving cutter, in contrast to a case in which the back face angle is less than 10°, swarf discharge can be smoothly performed. Also, in the skiving cutter, in contrast to a case in which the back face angle is larger than 50°, when it is assumed that a length of the peripheral relief face in a direction in which the tooth trace L extends is made constant, it is possible to reduce a length of the segmented cutting edge in a direction in which the tooth trace extends. When it is assumed that a length of the segmented cutting edge in a direction in which the tooth trace extends is made constant, it is possible to prevent a length of the peripheral relief face in a direction in which the tooth trace extends from becoming unnecessarily short.

In the skiving cutter having the peripheral relief face, a peripheral relief angle which is an angle of the peripheral relief face with respect to the tooth trace may be more than 0° and 12° or less.

In the skiving cutter, in contrast to a case in which the peripheral relief angle is equal to or less than 0°, rubbing of a tooth bottom portion of an internal gear with the peripheral relief face can be prevented, deterioration of surface characteristics in the tooth bottom portion of the internal gear can be reduced, and abrasion of the peripheral relief face can be reduced. In addition, in the skiving cutter, in contrast to a case in which the peripheral relief angle exceeds 12°, a cutter having an increased effective tooth width can be easily manufactured, and a service life of the cutter can be easily prolonged.

In any of the skiving cutters described above, the outer circumferential cutting edge of the segmented cutting edge having a helix angle of 10° or less may be in a virtual plane perpendicular to the axis.

In the skiving cutter, all of the outer circumferential cutting edges of the plurality of segmented cutting edges having the same position in the axial direction as each other extend in one virtual plane perpendicular to the axis. Therefore, in the skiving cutter, each of the outer circumferential cutting edges of the plurality of segmented cutting edges having the same position in the axial direction as each other and a cutting face which is continuous with the outer circumferential cutting edge can be processed together with mutually adjacent segmented cutting edges in the circumferential direction.

In any of the skiving cutters described above, the outer circumferential cutting edge of the segmented cutting edge having the helix angle $\alpha$ larger than 10° may be in a virtual plane perpendicular to the tooth trace.

In the skiving cutter, a direction in which the tooth trace extends is a cutting direction. Therefore, when the outer circumferential cutting edge extends in the virtual plane perpendicular to the tooth trace, cutting loads at portions on both sides of the outer circumferential cutting edge are made equal and an amount of wear at each position on the outer circumferential cutting edge can be made uniform.

In any of the skiving cutters described above, the skiving cutter may include a plurality of cutter pieces arranged in the axial direction, in which each of the cutter pieces has a segmented cutting edge row which is a collection of a plurality of segmented cutting edges having the same position in the axial direction as each other and arranged in the circumferential direction among the segmented cutting edges constituting each of the plurality of cutting edge portions, and a segmented base formed as a portion of the base and including the segmented cutting edge row formed on an outer circumference thereof, the segmented bases are separable from each other, and the skiving cutter may further include a positioning member which determines relative positions in the circumferential direction of the segmented cutting edges between the plurality of cutter pieces.

The skiving cutter includes a plurality of segmented bases which are separable from each other, and furthermore, among the plurality of segmented cutting edges constituting one cutting edge portion, only one segmented cutting edge is formed on one segmented base. Therefore, among the plurality of segmented cutting edges constituting one cutting edge portion, it is possible to process one segmented cutting edge without interfering with the other segmented cutting edges constituting the cutting edge portion.

Advantageous Effects of Invention

According to the skiving cutter of one aspect of the present invention, an internal gear can be precisely formed into a target shape and a service life of the skiving cutter can be prolonged.

DESCRIPTION OF EMBODIMENTS

Hereinafter, various embodiments of a skiving cutter according to the present invention will be described with reference to the drawings.

[First Embodiment]

A first embodiment of a skiving cutter will be described with reference to FIGS. 1 to 11.

First, a skiving machine on which a skiving cutter is mounted will be described.

Figure 1:
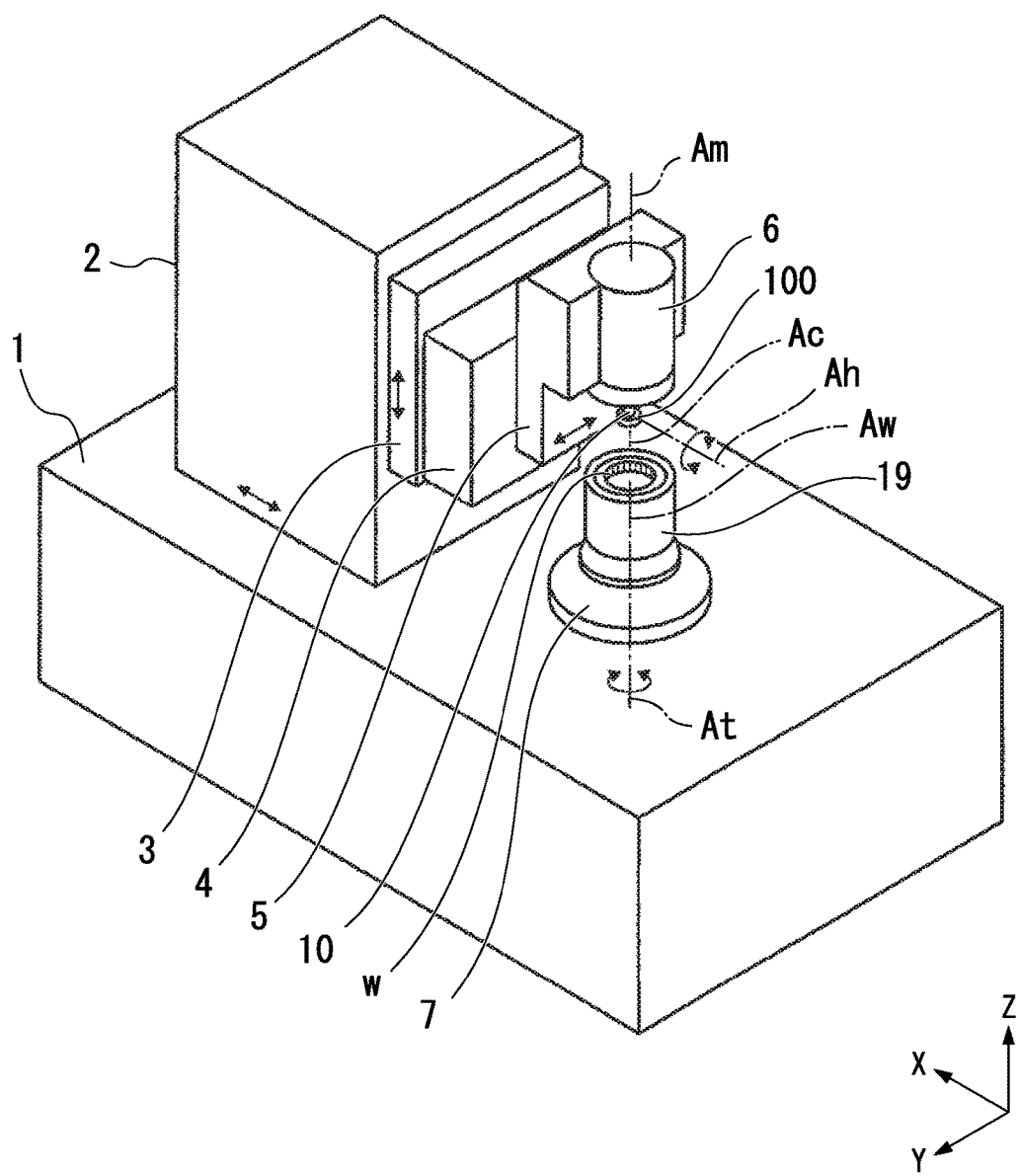
FIG. 1 is a perspective view of a skiving machine in a first embodiment.

As illustrated in FIG. 1, a skiving machine includes a bed 1, a column 2, a saddle 3, a head 4, a slider 5, a main spindle unit 6, and a rotary table 7.

The column 2 extends in a vertical direction. Here, the vertical direction is referred to as a Z direction, a direction perpendicular to the Z direction is referred to as a Y direction, and a direction perpendicular to the Z direction and the Y direction is referred to as an X direction. This column 2 is attached to the bed 1 to be movable in the X direction. The saddle 3 is attached to the column 2 to be movable in the Z direction. The head 4 is attached to the saddle 3 to be rotatable around a head center axis Ah extending in the X direction. The slider 5 is attached to the head 4 to be movable in a direction perpendicular to the head center axis Ah. The main spindle unit 6 is fixed to the slider 5. The main spindle unit 6 holds a skiving cutter 100 via a cutter arbor 10 and rotates the skiving cutter 100 around a main spindle rotation axis Am. A cutter center axis Ac, which is a rotational center axis of the skiving cutter 100, is positioned on an extension line of the main spindle rotation axis Am of the main spindle unit 6 in a state in which the skiving cutter 100 is held by the main spindle unit 6.

The rotary table 7 is disposed on the bed 1 at a position away from the column 2 in the X direction. This rotary table 7 is provided on the bed 1 to be rotatable around a table rotation axis At extending in the Z direction. On this rotary table 7, a workpiece holder 19 for holding a cylindrical workpiece W which is an internal gear material is attached.

Figure 2:
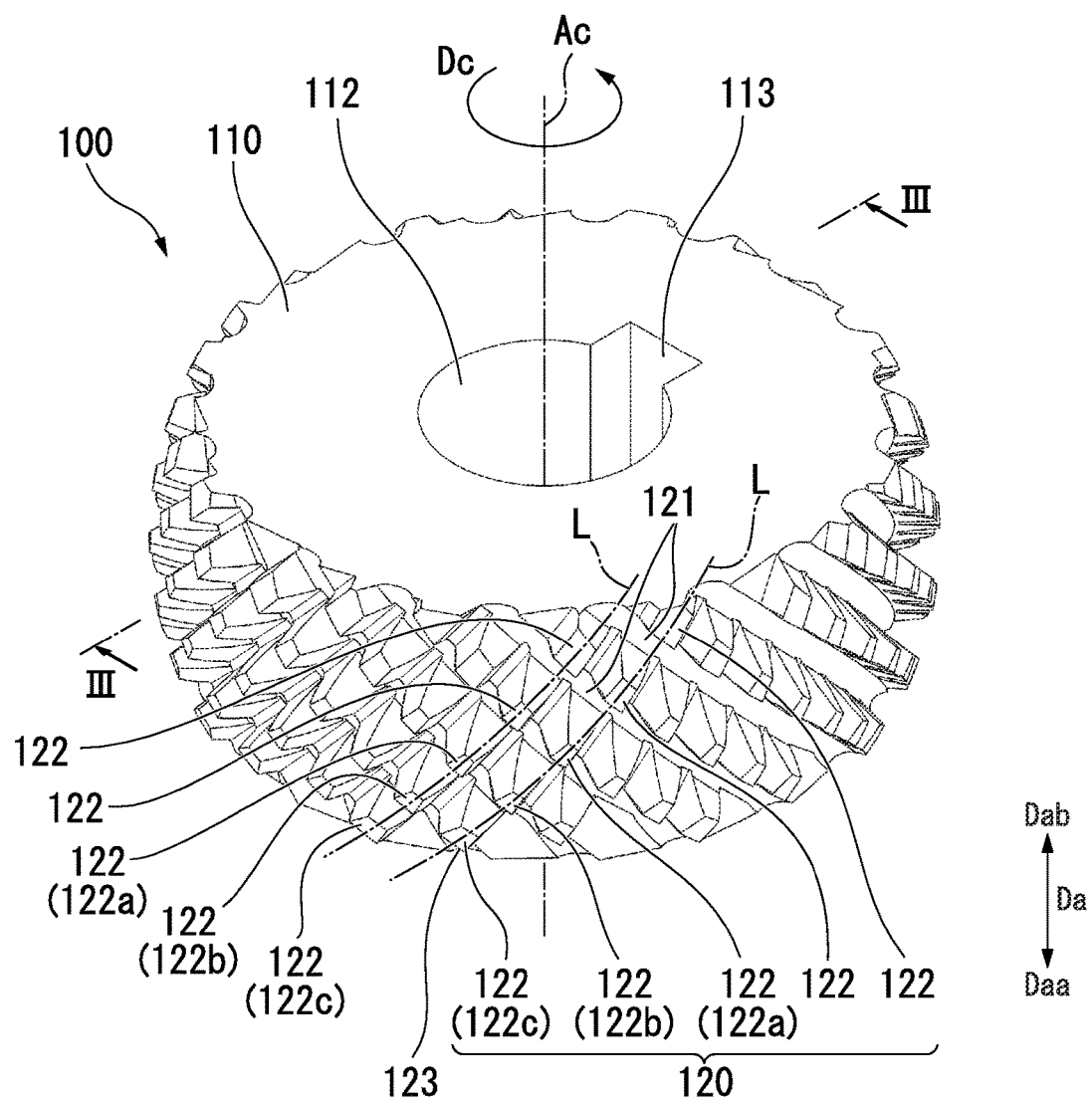
FIG. 2 is a perspective view of a skiving cutter in the first embodiment.
Figure 3:
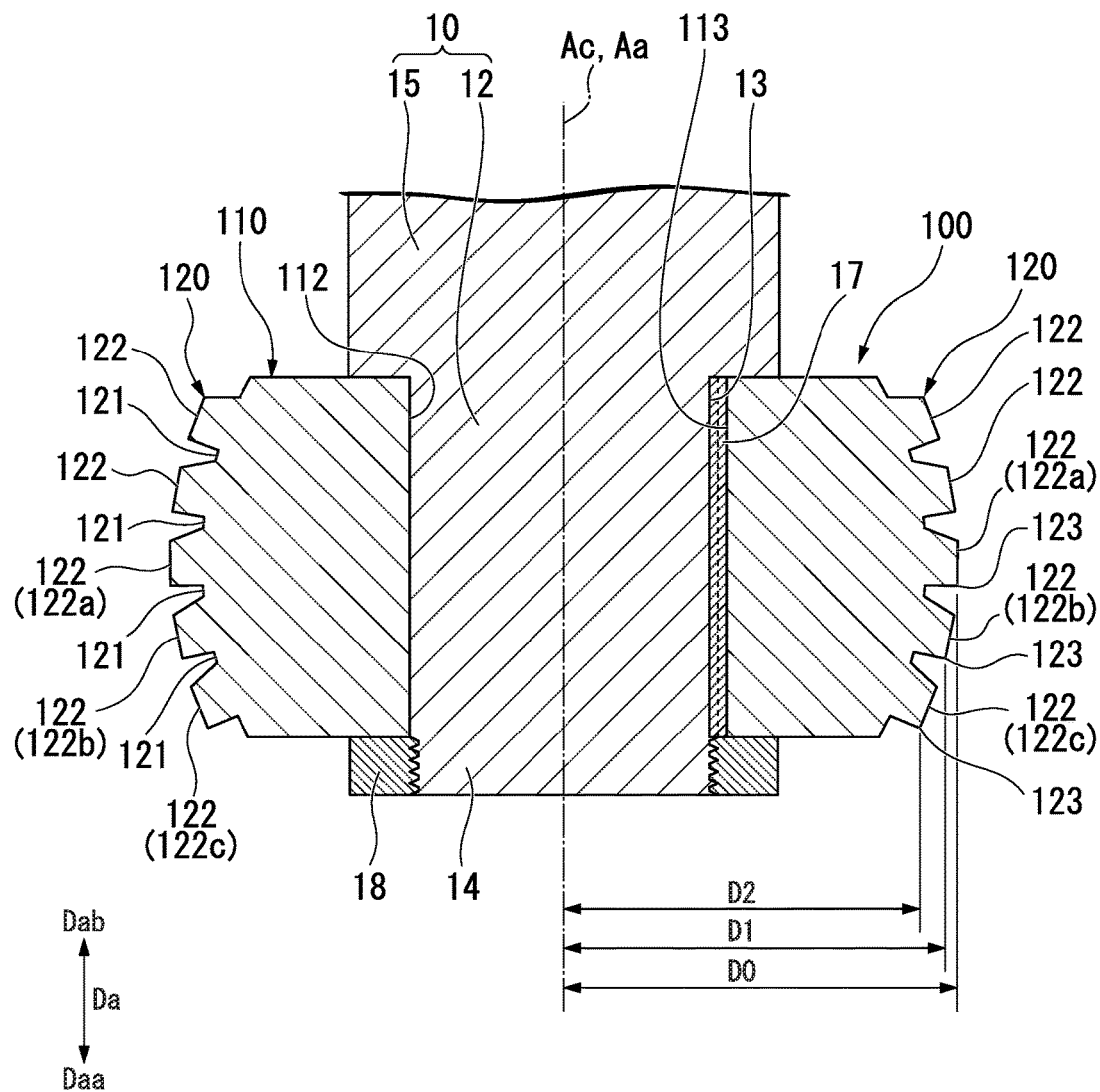
FIG. 3 is a cross-sectional view taken along line III-III in FIG. 2.

As illustrated in FIGS. 2 and 3, the skiving cutter 100 includes a barrel-shaped base 110 centered on the cutter center axis Ac and a plurality of cutting edge portions 120 protruding from an outer circumferential surface of the base 110. In the following description, a direction in which the cutter center axis Ac extends is referred to as an axial direction Da, and a circumferential direction with respect to the cutter center axis Ac is simply referred to as a circumferential direction Dc. In addition, one side in the axial direction Da is referred to as a distal end side Daa, and the other side is referred to as an attachment side Dab.

As described above, the base 110 has a barrel shape centered on the cutter center axis Ac. Therefore, at any position in the axial direction Da, the base 110 has a circular cross-sectional shape perpendicular to the cutter center axis Ac. The base 110 has a maximum outer diameter at a central position in the axial direction Da and an outer diameter gradually decreases from the central position toward the distal end side Daa and the attachment side Dab. An attachment hole 112 penetrating in the axial direction Da is formed in the base 110. The attachment hole 112 has a columnar shape centering on the cutter center axis Ac. The base 110 further has a key groove 113 recessed to a radial outer side with respect to the cutter center axis Ac from an inner circumferential surface of the attachment hole 112. The key groove 113 extends in the axial direction Da from an end face on the attachment side Dab to an end face on the distal end side Daa of the base 110.

The cutter arbor 10 includes a cutter attachment portion 12 that can be inserted into the attachment hole 112 of the skiving cutter 100 and a held portion 15 that is held by the main spindle unit 6. Both of the cutter attachment portion 12 and the held portion 15 have a columnar shape with an arbor center axis Aa as the center. The arbor center axis Aa coincides with the cutter center axis Ac in a state in which the cutter attachment portion 12 is inserted in the attachment hole 112 of the skiving cutter 100. Therefore, hereinafter, for convenience, a direction in which the arbor center axis Aa extends is also referred to as the axial direction Da which is a direction in which the cutter center axis Ac extends, and one side in the direction in which the arbor center axis Aa extends is referred to as the distal end side Daa and the other side is referred to as the attachment side Dab.

An outer diameter of the held portion 15 is larger than an outer diameter of the cutter attachment portion 12. The cutter attachment portion 12 is provided on the distal end side Daa of the held portion 15. A key groove 13 recessed to a radial inner side with respect to the arbor center axis Aa from an outer circumferential surface of the cutter attachment portion 12 is formed in the cutter attachment portion 12. The key groove 13 extends in the axial direction Da. A male screw 14 is formed at a portion of the cutter attachment portion 12 on the distal end side Daa.

When the skiving cutter 100 is attached to the cutter arbor 10, first, the cutter attachment portion 12 of the cutter arbor 10 is inserted into the attachment hole 112 of the skiving cutter 100. Next, a key 17 is inserted into a key space formed by the key groove 113 of the skiving cutter 100 and the key groove 13 of the cutter arbor 10. Then, a fixing nut 18 is screwed into the male screw 14 of the cutter arbor 10. Thereby, attachment of the skiving cutter 100 to the cutter arbor 10 is completed.

The plurality of cutting edge portions 120 are separated from each other in the circumferential direction Dc. A tooth trace L of each of the cutting edge portions 120 extends in a direction inclined with respect to the cutter center axis Ac. Also, the cutting edge portion 120 is divided into a plurality of segmented cutting edges 122 by cutting edge grooves 121 extending in a direction intersecting the tooth trace L. In the present embodiment, one cutting edge portion 120 has four or five segmented cutting edges 122. In FIG. 3, for convenience, the plurality of segmented cutting edges 122 constituting one cutting edge portion 120 are drawn in the axial direction Da in a virtual plane including the cutter center axis Ac.

Figure 4:
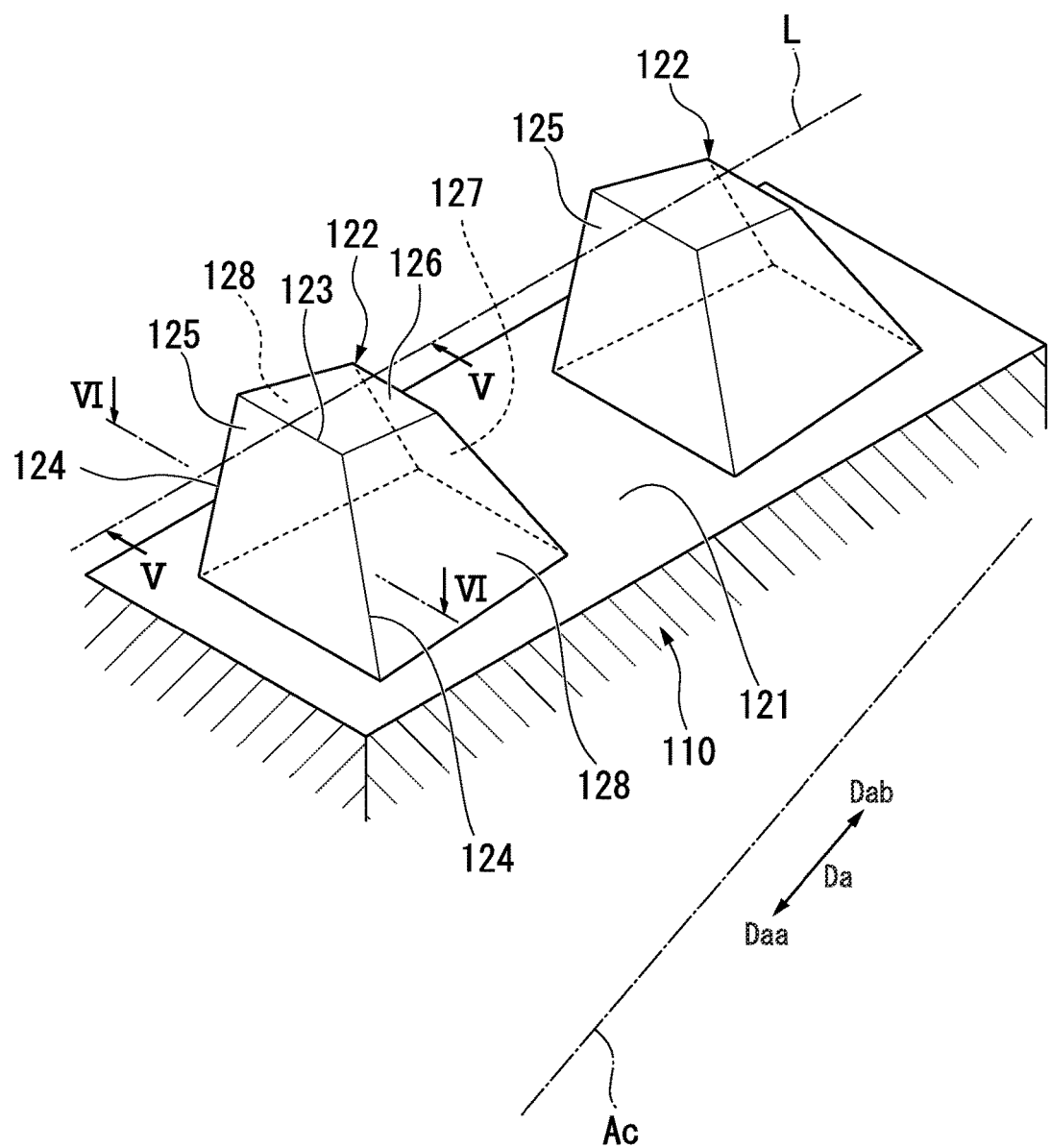
FIG. 4 is a perspective view of a segmented cutting edge in the first embodiment.
Figure 5:
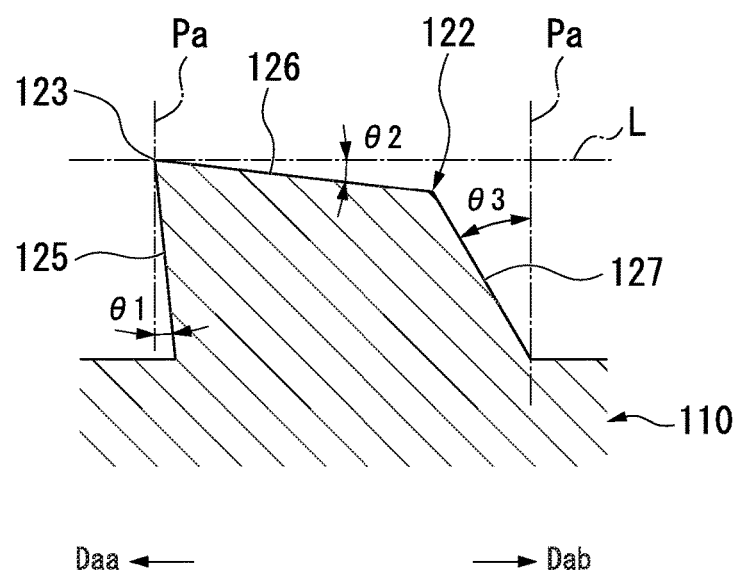
FIG. 5 is a cross-sectional view taken along line V-V in FIG. 4.
Figure 6:
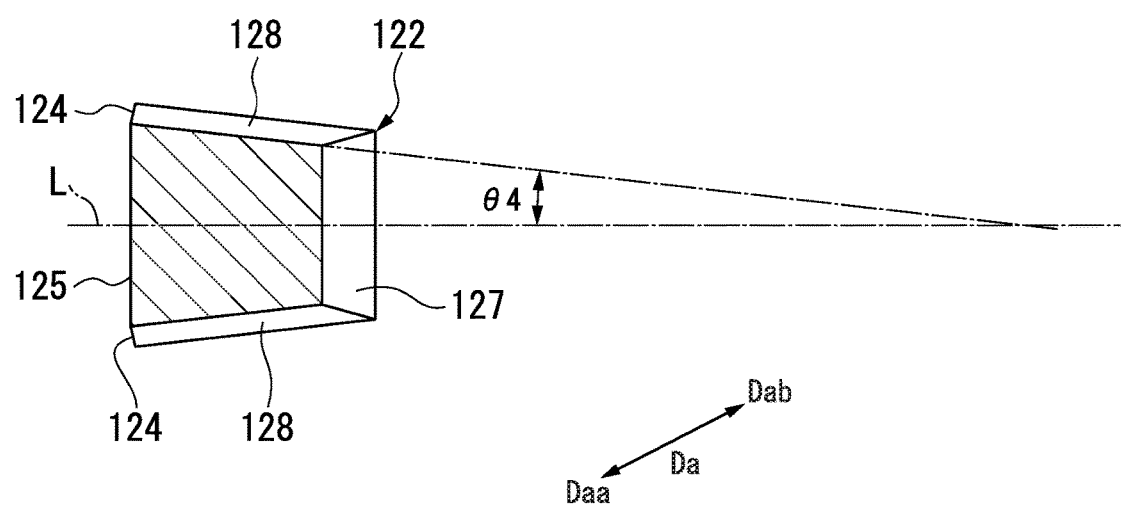
FIG. 6 is a cross-sectional view taken along line VI-VI in FIG. 4.

As illustrated in FIGS. 4 to 6, the segmented cutting edges 122 include an outer circumferential cutting edge 123, a pair of side cutting edges 124, a cutting face 125, an peripheral relief face 126, a back face 127, and a pair of side flank faces 128. Each of the cutting face 125, the pair of side flank faces 128, and the back face 127 extends from the outer circumferential surface of the base 110 toward the radial outer side with respect to the cutter center axis Ac. The cutting face 125 is directed toward the distal end side Daa in a direction in which the tooth trace L extends. The pair of side flank faces 128 are directed in a direction having a directional component perpendicular to the tooth trace L. The pair of side flank faces 128 are in a back-to-back relationship with each other. The back face 127 is positioned on the attachment side Dab in a direction in which the tooth trace L extends with respect to the cutting face 125 and is directed to the attachment side Dab in a direction in which the tooth trace L extends. The back face 127 is in a back-to-back relationship with the cutting face 125. The peripheral relief face 126 extends in a direction along the tooth trace L from an edge of the radial outer side of the cutting face 125 to an edge of the radial outer side of the back face 127. The outer circumferential cutting edge 123 is formed by an edge which is a corner of the cutting face 125 and the peripheral relief face 126. Therefore, the cutting face 125 extends from the outer circumferential cutting edge 123 toward a side approaching the base 110. Also, the back face 127 extends from an end opposite to the outer circumferential cutting edge 123 on the peripheral relief face 126 to the base 110 side. The outer circumferential cutting edge 123 is farthest away from the base 110 among constituent portions of the segmented cutting edge 122. The side cutting edge 124 is formed by an edge which is a corner of the cutting face 125 and the side flank face 128.

As illustrated in FIG. 5, a rake angle θ1 which is an angle of the cutting face 125 with respect to a virtual plane Pa perpendicular to the tooth trace L is 0° or more and 20° or less. When the rake angle θ1 is less than 0°, there is a likelihood that the cutting load increases, surface characteristics of the worked surface deteriorate, and an amount of wear increases. Also, when the rake angle θ1 exceeds 20°, there is a likelihood that a strength of the cutting edge deteriorates, thereby causing occurrence of chipping or the like. Therefore, the rake angle θ1 is preferably within the angle range described above.

An peripheral relief angle θ2, which is an angle of the peripheral relief face 126 with respect to the tooth trace L, is larger than 0° and 12° or less. When the peripheral relief angle θ2 is equal to or less than 0°, a tooth bottom portion of an internal gear is rubbed by the peripheral relief face 126, surface properties of the tooth bottom portion of the internal gear deteriorate, and an amount of wear on the peripheral relief face 126 increases. Also, when the peripheral relief angle θ2 exceeds 12°, a cutter having an increased effective tooth width cannot be easily manufactured, and a service life of the cutter cannot be easily prolonged. Therefore, the peripheral relief angle θ2 is preferably within the angle range described above. Further, it is particularly preferable that the peripheral relief angle θ2 be 5° or more. When the peripheral relief angle θ2 is 5° or more, it is possible to reliably avoid rubbing of the peripheral relief face 126 due to spring back caused by elastic deformation of the segmented cutting edges 122 at the time of cutting.

A back face angle θ3, which is an angle of the back face 127 with respect to the virtual plane Pa perpendicular to the tooth trace L, is 10° or more and 50° or less. When the back face angle θ3 is less than 10°, swarf discharge from the outer circumferential cutting edge 123 of a segmented cutting edge 122 positioned on the attachment side Dab from the segmented cutting edge 122 may not be performed smoothly. Also, if the back face angle θ3 is larger than 50°, when it is assumed that a length of the peripheral relief face 126 in a direction in which the tooth trace L extends is made constant, a length of the segmented cutting edges 122 in a direction in which the tooth trace L extends becomes unnecessarily long. In addition, if the back face angle θ3 is larger than 50°, when it is assumed that the length of the segmented cutting edge 122 in the direction in which the tooth trace L extends is made constant, a length of the peripheral relief face 126 in the direction in which the tooth trace L extends becomes unnecessarily short. Therefore, the back face angle θ3 is preferably within the angle range described above.

As illustrated in FIG. 6, a side relief angle θ4, which is an angle of the side flank face 128 with respect to the tooth trace L, is larger than 0° and 5° or less. When the side relief angle θ4 is 0° or less, there is a likelihood that a cutting load increases, surface properties of the worked surface deteriorate, and an amount of wear increases. When the side relief angle θ4 exceeds 20°, there is a likelihood that strength of the cutting edge deteriorates, thereby causing occurrence of chipping or the like. Therefore, the side relief angle θ4 is preferably within the angle range described above. Further, it is particularly preferable that the side relief angle θ4 be 2° or more.

As illustrated in FIG. 4, between a pair of groove side faces forming the cutting edge groove 121, one side face forms the back face 127 of a segmented cutting edge 122, and the other side face forms the cutting face 125 of a segmented cutting edge 122.

Here, as illustrated in FIG. 3, among the plurality of cutting edges 122 constituting the cutting edge portion 120, the segmented cutting edge 122 formed on the base 110 at a central portion in the axial direction Da is referred to as a finishing cutting edge (reference cutting edge) 122a, and the remaining segmented cutting edges 122 are referred to as coarse cutting edges 122b and 122c. Also, a distance from the cutter center axis Ac to the outer circumferential cutting edge 123 is referred to as an axis-cutting edge distance D. Among the axis-cutting edge distances D of the plurality of segmented cutting edges 122 constituting the cutting edge portion 120, an axis-cutting edge distance D0 of the finishing cutting edge 122a is the largest. As a distance from the finishing cutting edge 122a increases, the axis-cutting edge distance D of the plurality of coarse cutting edges 122b and 122c gradually decreases. In other words, an axis-cutting edge distance D1 of a first coarse cutting edge 122b adjacent to the finishing cutting edge 122a in a direction in which the tooth trace L extends is the next largest after the axis-cutting edge distance D0 of the finishing cutting edge 122a. An axis-cutting edge distance D2 of a second coarse cutting edge 122c adjacent to the first coarse cutting edge 122b on a side opposite to the finishing cutting edge 122a in a direction in which the tooth trace L extends is the next largest after the axis-cutting edge distance D1 of the first coarse cutting edge 122b. That is, the axis-cutting edge distance D decreases in the order of the finishing cutting edge 122a, the first coarse cutting edge 122b, and the second coarse cutting edge 122c.

Figure 7:
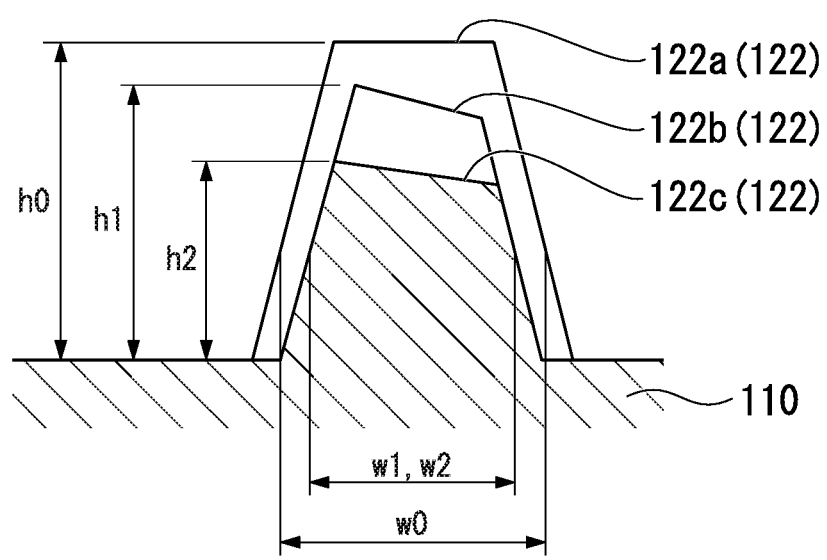
FIG. 7 is an explanatory view for describing sizes of a plurality of segmented cutting edges constituting a cutting edge portion in the first embodiment.

As illustrated in FIG. 7, a cutting edge height h0 of the finishing cutting edge 122a is the largest among cutting edge heights h of the plurality of segmented cutting edges 122 constituting the cutting edge portion 120. Among the plurality of segmented cutting edges 122 constituting the cutting edge portion 120, between two segmented cutting edges 122 adjacent to each other in a tooth trace direction in which the tooth trace L extends, a cutting edge height h of one of the segmented cutting edges 122 which is more distant from the finishing cutting edge 122a is equal to or less than a cutting edge height h of the other segmented cutting edge 122. In other words, a cutting edge height h1 of the coarse cutting edge 122b is equal to or less than the cutting edge height h0 of the finishing cutting edge 122a, and a cutting edge height h2 of the coarse cutting edge 122c is equal to or less than the cutting edge height h1 of the coarse cutting edge 122b. Therefore, in the present embodiment, the segmented cutting edge 122 on the distal end side Daa has the smallest cutting edge height h, and the cutting edge height increases as a position of the segmented cutting edge 122 becomes closer to the attachment side Dab until reaching the finishing cutting edge 122a.

In addition, among the cutting edge widths w of the plurality of segmented cutting edges 122 constituting the cutting edge portion 120, a cutting edge width w0 of the finishing cutting edge 122a is the largest. Among the plurality of segmented cutting edges 122 constituting the cutting edge portion 120, between two segmented cutting edges 122 adjacent to each other in the tooth trace direction, a cutting edge width w of one of the segmented cutting edges 122 which is more distant from the finishing cutting edge 122a is equal to or less than a cutting edge width w of the other segmented cutting edge 122. That is, a cutting edge width w1 of the coarse cutting edge 122b is equal to or less than the cutting edge width w0 of the finishing cutting edge 122a, and a cutting edge width w2 of the coarse cutting edges 122c is equal to or less than the cutting edge width w2 of the coarse cutting edges 122b. Therefore, in the present embodiment, the segmented cutting edge 122 on the distal end side Daa has the narrowest cutting edge width, and the cutting edge width increases as a position of the segmented cutting edge 122 becomes closer to the attachment side Dab until reaching the finishing cutting edge 122a.

Figure 8:
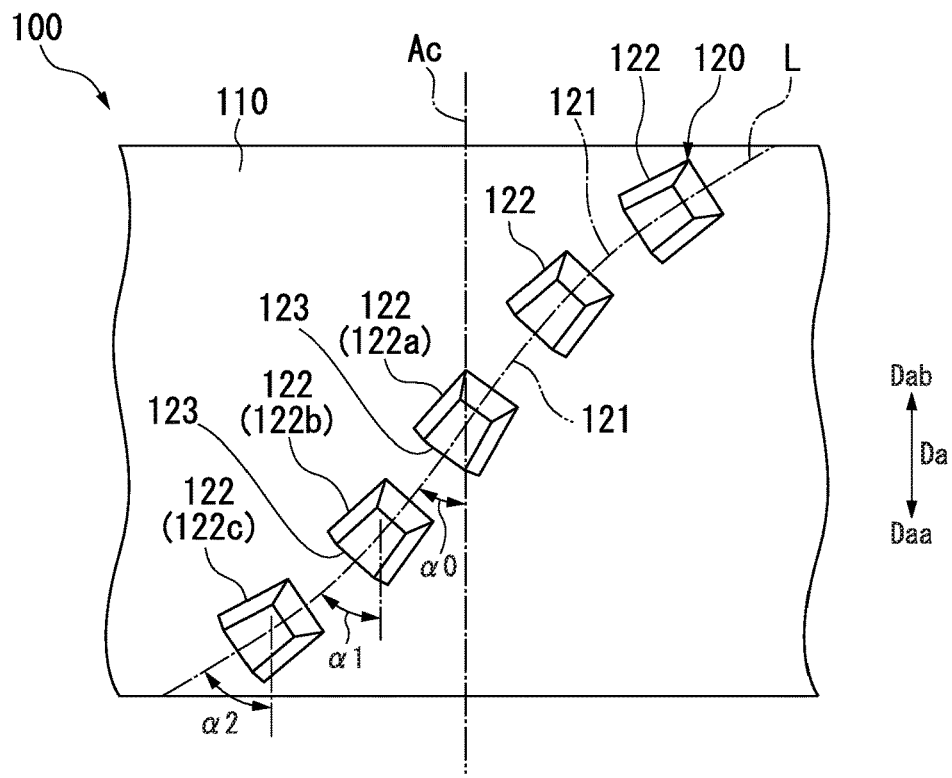
FIG. 8 is an explanatory view illustrating helix angles and circumferential positions of the plurality of segmented cutting edges constituting the cutting edge portion in the first embodiment.

As illustrated in FIG. 8, a helix angle $\alpha$, which is an angle of the tooth trace L with respect to the cutter center axis Ac, is different according to a position of the tooth trace L in the axial direction Da. Therefore, the helix angle $\alpha$ for each of the plurality of segmented cutting edges 122 constituting the cutting edge portion 120 is different according to a position of each segmented cutting edge 122 in the axial direction Da. In other words, the helix angle $\alpha$ for each of the plurality of coarse cutting edges 122b and 122c is different according to a distance from the finishing cutting edge 122a to each of the coarse cutting edges 122b and 122c. In addition, due to the relationship in which the helix angle $\alpha$ of the tooth trace L is different according to a position in the axial direction Da of the tooth trace L, positions of the plurality of segmented cutting edges 122 in a circumferential direction Dc are different in contrast to a case in which the helix angle $\alpha$ is constant at each position in the axial direction Da. Further, FIG. 8 illustrates a state in which an outer circumferential surface of the base 110 is deployed on a plane.

Figure 9:
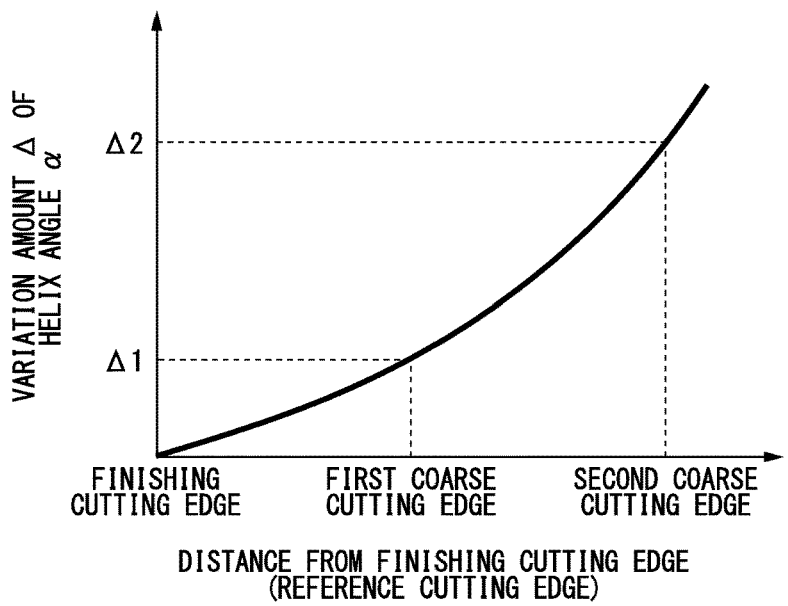
FIG. 9 is a graph showing an amount of variation in helix angle of the plurality of segmented cutting edges constituting the cutting edge portion in the first embodiment.

As shown in FIG. 9, variation amounts $\Delta 1$ and $\Delta 2$ of the helix angle $\alpha$ of each of the coarse cutting edges 122b and 122c with respect to a helix angle $\alpha 0$ of the finishing cutting edge 122a increase as a distance from the finishing cutting edge 122a increases. That is, a variation amount $\Delta 2$ of the helix angle $\alpha$ of the second coarse cutting edge 122c is larger than a variation amount $\Delta 1$ of the helix angle $\alpha$ of the first coarse cutting edge 122b.

In addition, as illustrated in FIG. 8, the helix angles $\alpha 1$ and $\alpha 2$ of the plurality of segmented cutting edges 122b and 122c excluding the finishing cutting edge 122a among the plurality of segmented cutting edges 122 constituting the cutting edge portion 120 increase as a distance from the finishing cutting edge 122a to the segmented cutting edges 122b and 122c increases. Further, in FIG. 8, $\alpha 0$ is the helix angle of the finishing cutting edge 122a, $\alpha 1$ is the helix angle of the first coarse cutting edge 122b, and $\alpha 2$ is the helix angle of the second coarse cutting edge 122c.

Figure 10:
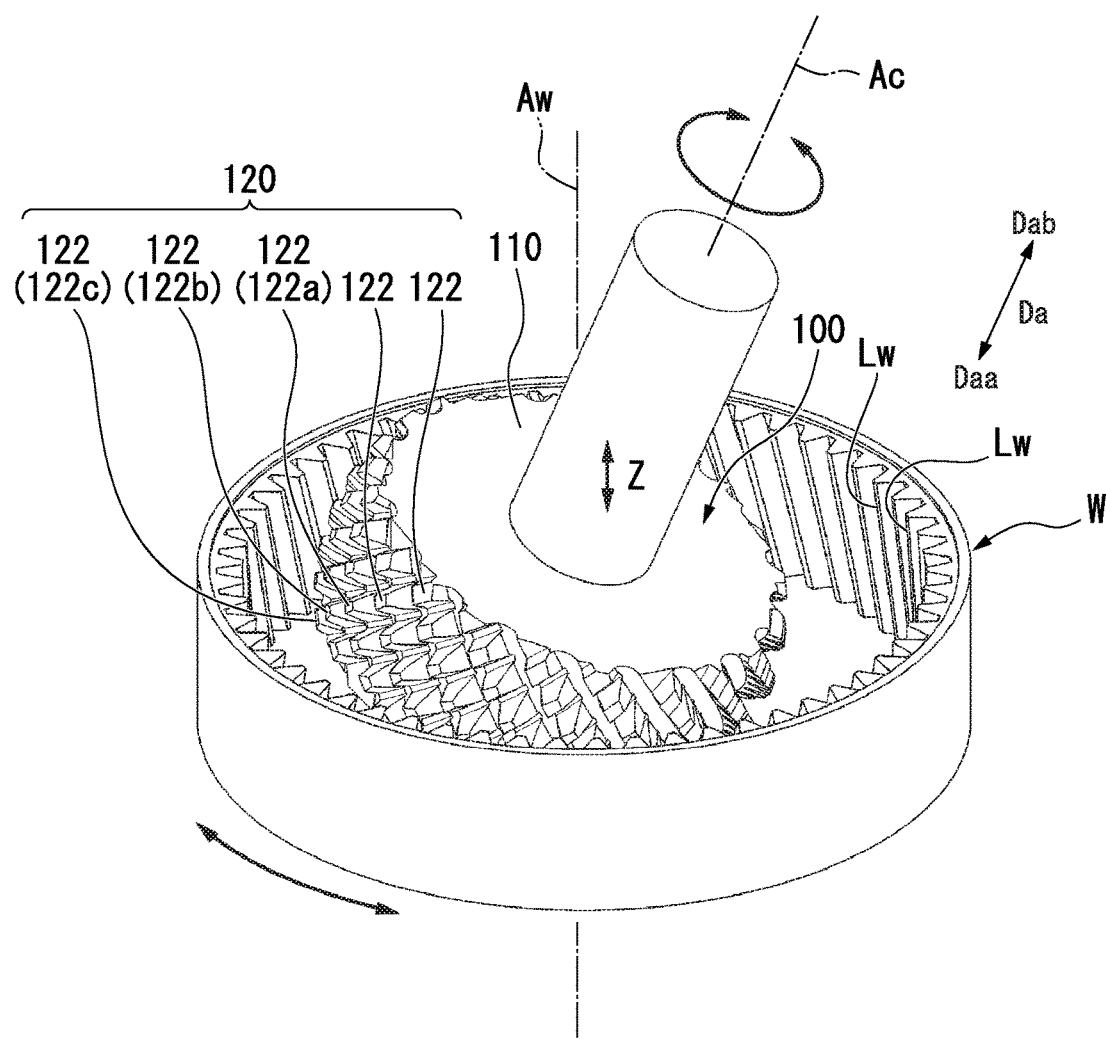
FIG. 10 is a perspective view of a skiving cutter and a workpiece which are in a processing state in the first embodiment.
Figure 11:
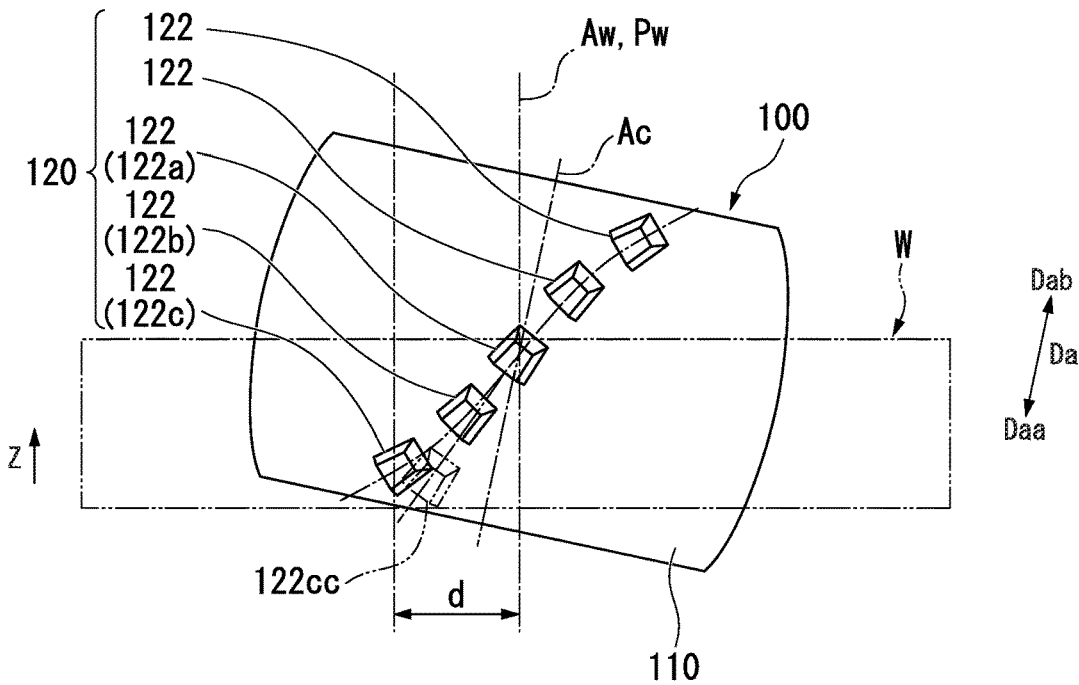
FIG. 11 is a side view of a skiving cutter which is in a processing state in the first embodiment.

When manufacturing an internal gear, as illustrated in FIG. 1, a cylindrical workpiece W, which is an internal gear material, is held by the workpiece holder 19 on the rotary table 7. At this time, the table rotation axis At of the rotary table 7 and a workpiece center axis Aw which is a central axis of the cylindrical workpiece W coincide with each other. Further, the skiving cutter 100 described above is mounted on the main spindle unit 6 of the skiving machine. Next, the head 4 rotates around the head center axis Ah with respect to the saddle 3, and the main spindle rotation axis Am of the main spindle unit 6 is inclined with respect to the workpiece center axis Aw. Further, a sequential order of executing the above-described processes is not limited to the sequential order described above. As a result, as illustrated in FIGS. 10 and 11, the cutter center axis Ac is inclined with respect to the workpiece center axis Aw. In this state, the workpiece W rotates around the workpiece center axis Aw and the skiving cutter 100 reciprocates in the Z direction while rotating around the cutter center axis Ac. As described above, a method of skiving processing is a method of processing the workpiece W in a state in which the cutter center axis Ac is inclined with respect to the workpiece center axis Aw.

In this method of the skiving process, as illustrated in FIGS. 10 and 11, among the plurality of segmented cutting edges 122 constituting the cutting edge portion 120, a segmented cutting edge 122 on the attachment side Dab with respect to the finishing cutting edge 122a does not come into contact with the workpiece W. That is, among the plurality of segmented cutting edges 122 constituting the cutting edge portion 120, the segmented cutting edge 122 on the attachment side Dab with respect to the finishing cutting edge 122a does not contribute to the skiving processing.

Among the plurality of segmented cutting edges 122 constituting the cutting edge portion 120, the segmented cutting edge 122c furthest toward the distal end side Daa comes into contact with the workpiece W first, the segmented cutting edge 122b next after the segmented cutting edge 122c from the attachment side Dab subsequently comes into contact with the workpiece W, and the segmented cutting edge 122a which is furthest toward the attachment side Dab subsequently comes into contact with the workpiece W. That is, in the present embodiment, the second coarse cutting edge 122c comes into contact with the workpiece W first, then the first coarse cutting edge 122b subsequently comes into contact with the workpiece W, and the finishing cutting edge 122a comes into contact with the workpiece W finally.

When it is assumed that the plurality of segmented cutting edges 122 constituting the cutting edge portion 120 have the same cutting edge height and the same cutting edge width, a cutting load applied to the segmented cutting edge 122c furthest toward the distal end side Daa is significantly higher than the cutting load applied to the remaining segmented cutting edges 122, and an amount of wear on the segmented cutting edge 122c furthest toward the distal end side Daa is larger than an amount of wear on the remaining segmented cutting edges 122. On the other hand, in the present embodiment, since the cutting edge height of the segmented cutting edges 122 increases as a position thereof becomes closer to the attachment side Dab from the distal end side Daa and the cutting edge width of the segmented cutting edges 122 increases as a position thereof becomes closer to the attachment side Dab from the distal end side Daa, an amount of wear on the plurality of segmented cutting edges 122 can be made uniform, and the service life of the skiving cutter 100 can be prolonged.

Here, as illustrated in FIG. 10, an internal gear in which a tooth trace Lw is inclined with respect to the workpiece center axis Aw and a helix angle of the tooth trace Lw is constant at any position in a direction in which the workpiece center axis Aw extends is assumed to be processed by the method of the skiving processing. Further, it is assumed that the axis-cutting edge distances D of the plurality of segmented cutting edges 122 constituting the cutting edge portion 120 of the skiving cutter 100 are constant. In other words, an outer shape of the skiving cutter 100 is cylindrical. In this case, depending on an inclination angle of the cutter center axis Ac with respect to the workpiece center axis Aw, when a cutting edge groove of the workpiece W is being cut by one cutting edge portion 120 among the plurality of cutting edge portions 120, another cutting edge portion 120 may cut a region that is not supposed to be cut in the workpiece W in some cases. In the present embodiment, the axis-cutting edge distance D of the finishing cutting edge 122a is the largest in the plurality of cutting edges 122 constituting the cutting edge portion 120, and the axis-cutting edge distance D of the coarse cutting edges 122b and 122c gradually decreases as the distance from the finishing cutting edge 122a to each of the coarse cutting edges 122b and 122c increases. Therefore, in the skiving cutter 100 of the present embodiment, when a tooth groove of the workpiece W is being cut by one cutting edge portion 120 among the plurality of cutting edge portions 120, it is possible to prevent another cutting edge portion 120 from cutting a region in the workpiece W that is not supposed to be cut.

The inventor found that a processing accuracy for each tooth of the internal gear does not meet expected processing accuracy when the workpiece W is processed by the method of the skiving processing with the skiving cutter 100 in which the plurality of segmented cutting edges 122 are set such that the axis-cutting edge distance D is the largest at the finishing cutting edge 122a and the axis-cutting edge distance D gradually decreases as the distance from the finishing cutting edge 122a to each of the coarse cutting edges 122b and 122c increases. Therefore, the inventor simulated processing of the workpiece W using the skiving cutter 100 having a constant helix angle α at each of the plurality of segmented cutting edges 122 constituting the cutting edge portion 120 on a computer. The result was that when one cutting edge portion 120 processed one tooth groove in the workpiece W, as illustrated in FIG. 11, even when one segmented cutting edge 122 constituting the cutting edge portion 120, for example, the finishing cutting edge 122a was positioned at an accurate position with respect to the tooth groove, it was found that another segmented cutting edge 122 constituting the cutting edge portion 120, for example, the second coarse cutting edge 122cc (indicated by a two-dot broken line in FIG. 11) was not positioned at an accurate position with respect to a tooth groove. As a result of investigating this phenomenon in detail, it was found that there was a variation in an amount of deviation of each of the coarse cutting edges 122b and 122c with respect to the tooth groove of the workpiece W depending on a distance d from a virtual plane Pw including the workpiece center axis Aw and a position at which the finishing cutting edge 122a was in contact with the workpiece W. Therefore, by changing the helix angles α1 and α2 of the coarse cutting edges 122b and 122c with respect to the helix angle α0 of the finishing cutting edge 122a as described above, all the segmented cutting edges 122 constituting the cutting edge portion 120 can be positioned at accurate positions with respect to the tooth grooves of the workpiece W. As described above, when the helix angle α of the tooth trace L is changed in accordance with a position in the axial direction Da of the tooth trace L, positions of the plurality of segmented cutting edges 122 in the circumferential direction Dc are different from a case in which the helix angle α is constant at each position in the axial direction Da.

Since the helix angle α1 and α2 of each of the coarse cutting edges 122b and 122c are changed with respect to the helix angle α0 of the finishing cutting edge 122a as described above, the skiving cutter 100 of the present embodiment allows all the segmented cutting edges 122 constituting the cutting edge portion 120 to be positioned at accurate positions with respect to the tooth grooves of the workpiece W as described above. Therefore, in the skiving cutter 100 of the present embodiment, the processing accuracy for the workpiece W can be enhanced. In addition, in the skiving cutter 100 of the present embodiment, since all the segmented cutting edges 122 constituting the cutting edge portion 120 can be positioned at accurate positions with respect to tooth grooves of the workpiece W, a load applied to each of the segmented cutting edges 122 constituting the cutting edge portion 120 can be reduced and a service life of the skiving cutter 100 can be prolonged.

In the present embodiment, one cutting edge portion 120 has four or five segmented cutting edges 122, of which three of the segmented cutting edges 122 contribute to the skiving processing. However, one cutting edge portion 120 may have three segmented cutting edges 122, of which two segmented cutting edges 122 may contribute to the skiving processing, or one cutting edge portion 120 may have five segmented cutting edges 122 or more, of which four segmented cutting edges 122 or more may contribute to the skiving processing.

[Second Embodiment]

Figure 12:
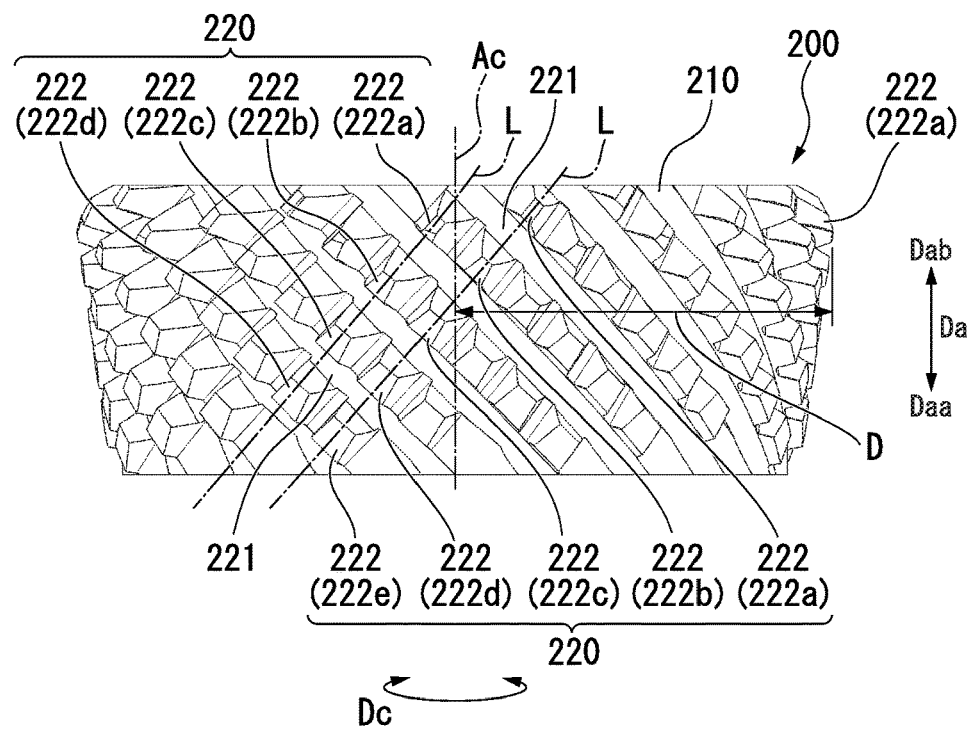
FIG. 12 is a side view of a skiving cutter in a second embodiment.

A second embodiment of a skiving cutter will be described with reference to FIG. 12.

As in the skiving cutter 100 of the first embodiment, a skiving cutter 200 of the present embodiment includes a base 210 and a plurality of cutting edge portions 220 protruding from an outer circumferential surface of the base 210. The base 210 of the present embodiment has a shape of a portion on the distal end side Daa of the barrel-shaped base 110 in the first embodiment described above or a truncated cone shape with the cutter center axis Ac as a center. Therefore, the base 210 has a circular cross-sectional shape perpendicular to a cutter center axis Ac at any position in an axial direction Da. In the base 210, an outer diameter of an end on an attachment side Dab is the largest, and the outer diameter gradually decreases toward a distal end side Daa.

The plurality of cutting edge portions 220 are separated from each other in a circumferential direction Dc. A tooth trace L of each of the cutting edge portions 220 extends in a direction inclined with respect to the cutter center axis Ac. Also, the cutting edge portion 220 is divided into a plurality of segmented cutting edges 222 by cutting edge grooves 221 extending in a direction intersecting the tooth trace L. In the present embodiment, an axis-cutting edge distance D0 of the segmented cutting edge 222 furthest toward the attachment side Dab is the largest among axis-cutting edge distances D of the plurality of segmented cutting edges 222 constituting the cutting edge portion 220, and the axis-cutting edge distance D gradually decreases toward the segmented cutting edge 222 on the distal end side Daa. In other words, in the present embodiment, among the plurality of segmented cutting edges 222 constituting the cutting edge portion 220, the segmented cutting edge 222 positioned furthest toward the attachment side Dab forms a finishing cutting edge (reference cutting edge) 222a, and the other segmented cutting edges 222 form coarse cutting edges 222b to 222e.

As in the segmented cutting edges 122 of the first embodiment, each of the segmented cutting edges 222 includes an outer circumferential cutting edge, a pair of side cutting edges, a cutting face, an peripheral relief face, a back face, and a pair of side flank faces. A rake angle of the cutting face, an peripheral relief angle of the peripheral relief face, a back face angle of the back face, and a side relief angle of the side flank face are all within the angular ranges described in the first embodiment. Dimensional relationships between the respective cutting edge heights of the plurality of segmented cutting edges 222 constituting the cutting edge portion 220 are the same as the relationships described in the first embodiment. In addition, dimensional relationships between the respective cutting edge widths of the plurality of segmented cutting edges 222 constituting the cutting edge portion 220 are the same as the relationships described in the first embodiment. Relationships between the respective helix angles of the plurality of segmented cutting edges 222 constituting the cutting edge portion 220 are the same as the relationships described in the first embodiment.

As in the skiving cutter 100 of the first embodiment, also in the skiving cutter 200 of the present embodiment, since each of the coarse cutting edges 222b to 222e has a helix angle α which is different from a helix angle α of the finishing cutting edge 222a, the processing accuracy for a workpiece W can be enhanced and a service life of the skiving cutter 200 can be prolonged.

Further, as described above, since the segmented cutting edge 222 positioned furthest toward the attachment side Dab forms the finishing cutting edge (reference cutting edge) 222a, and the other segmented cutting edges 222 form the coarse cutting edges 222b to 222e, the skiving cutter 200 of the present embodiment allows all the segmented cutting edges 222 to contribute to the processing of the workpiece W.

In the present embodiment, one cutting edge portion 220 has four or five segmented cutting edges 222. However, the number of segmented cutting edges 222 included in one cutting edge portion 220 may be less than this, and may be more than this.

[Third Embodiment]

A third embodiment of a skiving cutter will be described with reference to FIGS. 13 to 15.

Figure 13:
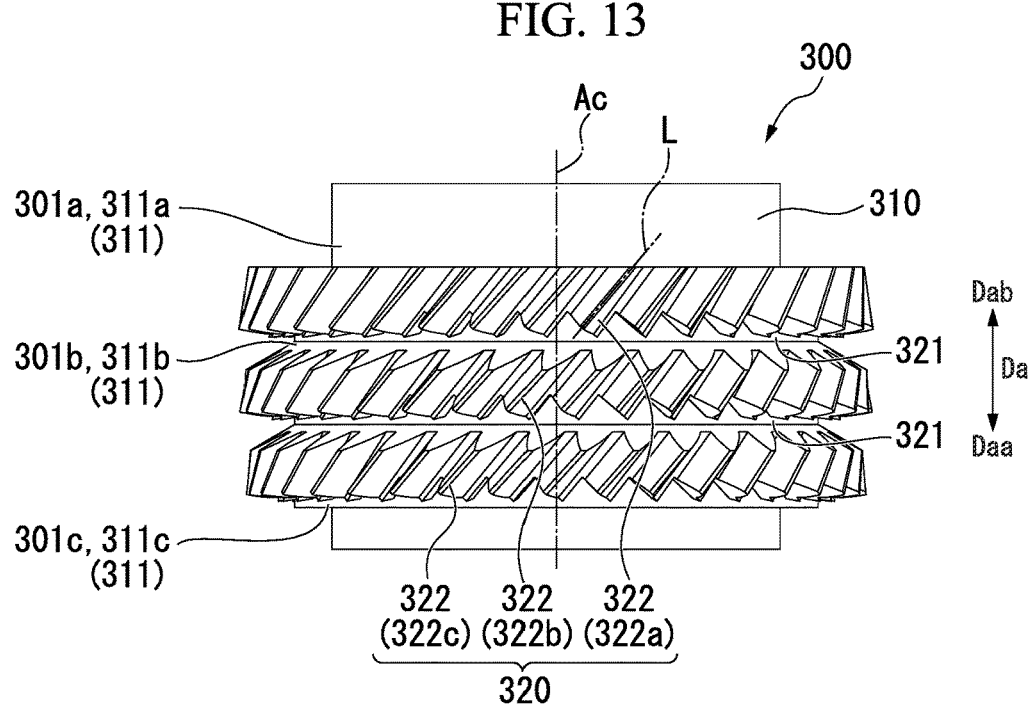
FIG. 13 is a side view of a skiving cutter in a third embodiment.
Figure 14:
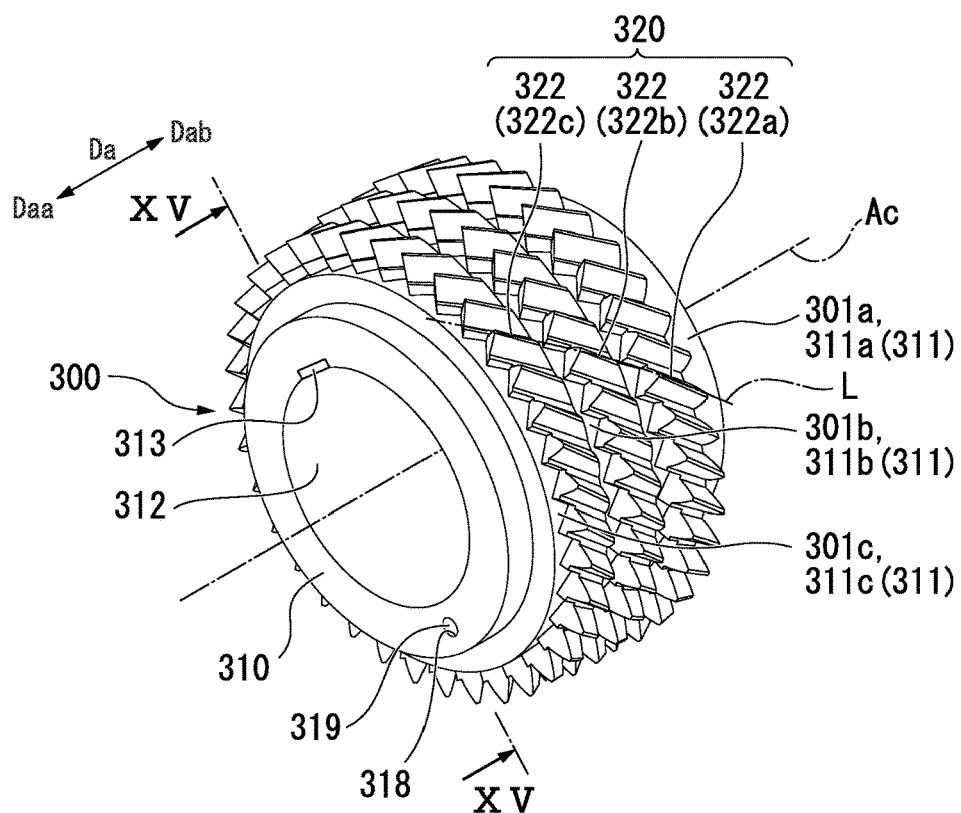
FIG. 14 is a perspective view of a skiving cutter in the third embodiment.

As illustrated in FIGS. 13 and 14, as in the skiving cutter 100 of the first embodiment, a skiving cutter 300 of the present embodiment includes a base 310 and a plurality of cutting edge portions 320 protruding from an outer circumferential surface of the base 310. Also in the base 310 of the present embodiment, a cross-sectional shape perpendicular to a cutter center axis Ac is circular at any position in an axial direction Da.

Figure 15:
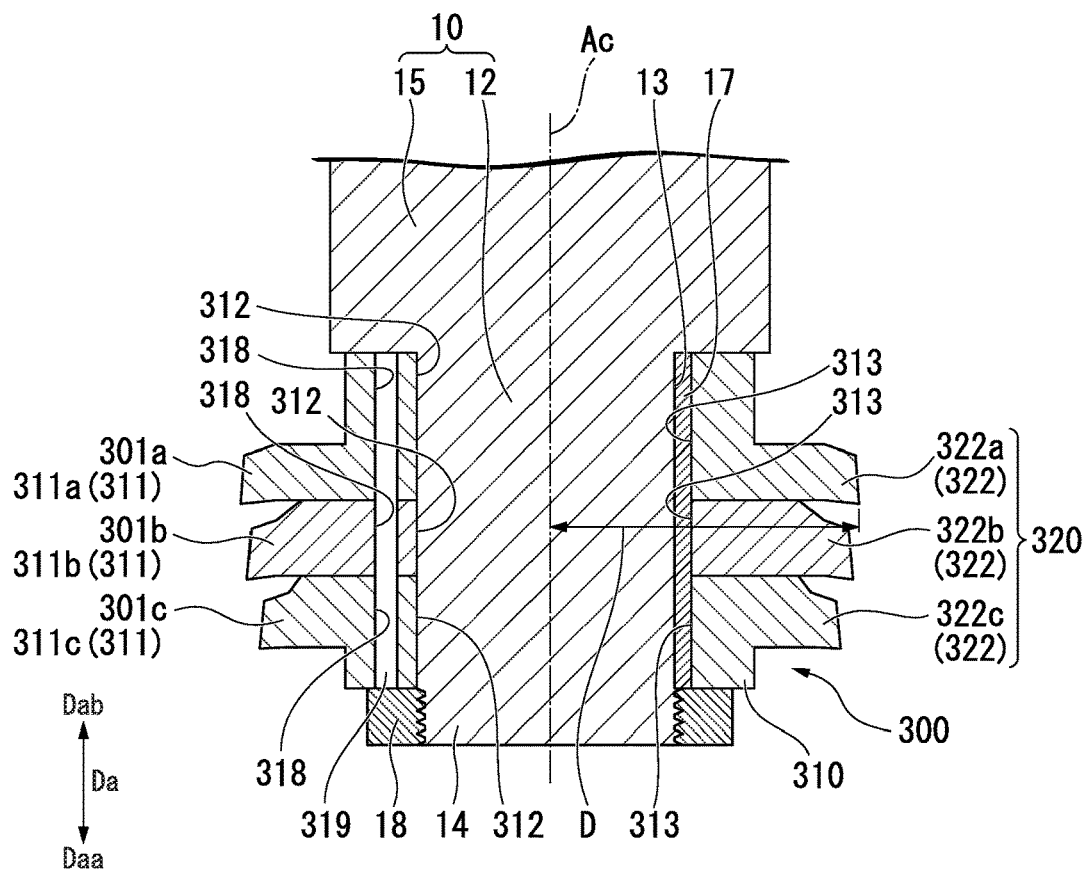
FIG. 15 is a cross-sectional view taken along line XV-XV in FIG. 14.

As illustrated in FIG. 15, the base 310 of the present embodiment includes a plurality of segmented bases 311 arranged in the axial direction Da and separable from each other, and a positioning pin 319. The number of segmented bases 311 in the present embodiment is three. Among the plurality of segmented bases 311, an outer diameter of a segmented base 311a furthest toward the attachment side Dab is the largest, and the outer diameter decreases toward segmented bases 311b and 311c on a distal end side Daa.

The plurality of cutting edge portions 320 are separated from each other in a circumferential direction on the outer circumferential surface of the base 310. A tooth trace L of each of the cutting edge portions 320 extends in a direction inclined with respect to the cutter center axis Ac. Also, the cutting edge portion 320 is divided into a plurality of segmented cutting edges 322 by cutting edge grooves 321 extending in a direction intersecting the tooth trace L. In the present embodiment, the number of segmented cutting edges 322 constituting one cutting edge portion 320 is three which is the same as the number of segmented bases 311. Each of the segmented cutting edges 322 constituting one cutting edge portion 320 is formed on a different segmented base 311. Therefore, among the plurality of segmented cutting edges 322 constituting each of the plurality of cutting edge portions 320, a segmented cutting edge row which is a collection of a plurality of segmented cutting edges 322 having the same position in the axial direction Da as each other and arranged in the circumferential direction is formed in one segmented base 311.

As illustrated in FIG. 15, an attachment hole 312 penetrating in the axial direction Da is formed in each of the plurality of segmented bases 311. Inner diameters of the attachment holes 312 of the plurality of segmented bases 311 are the same. A key groove 313 recessed from an inner circumferential surface of the attachment hole 312 to a radial outer side with respect to the cutter center axis Ac is further formed in the segmented base 311. The key groove 313 extends in the axial direction Da from an end face on the attachment side Dab to an end face on the distal end side Daa of the segmented base 311. A pin hole 318 which is parallel to the cutter center axis Ac and penetrating in the axial direction Da is further formed in the plurality of segmented bases 311.

Among axis-cutting edge distances D of the plurality of segmented cutting edges 322 constituting the cutting edge portion 320, an axis-cutting edge distance D of the segmented cutting edge 322 furthest toward the attachment side Dab, that is, the segmented cutting edge 322 formed on the segmented base 311 furthest toward the attachment side Dab is the largest, and the axis-cutting edge distance D gradually decreases toward the segmented cutting edge 322 on the distal end side Daa. In other words, also in the present embodiment, as in the second embodiment, among the plurality of segmented cutting edges 322 constituting the cutting edge portion 320, a segmented cutting edge 322 positioned furthest toward the attachment side Dab forms a finishing cutting edge (reference cutting edge) 322a, and the other segmented cutting edges 322 form coarse cutting edges 322b and 322c. Therefore, among the plurality of segmented bases 311, a plurality of finishing cutting edges 322a are formed only on the segmented base 311a furthest toward the attachment side Dab. In the present embodiment, the segmented base 311a and the plurality of finishing cutting edges 322a constitute a finishing cutting edge cutter piece 301a. Among the plurality of segmented bases 311, a plurality of first coarse cutting edges 322b are formed only on a segmented base 311b adjacent to the segmented base 311a on which the finishing cutting edges 322a are formed. In the present embodiment, the segmented base 311b and the plurality of first coarse cutting edges 322b constitute the first coarse cutting edge cutter piece 301b. A plurality of second coarse cutting edges 322c are formed only on a remaining segmented base 311c among the plurality of segmented bases 311. In the present embodiment, the segmented base 311c and a plurality of second coarse cutting edges 322c constitute a second coarse cutting edge cutter piece 301c.

As in the segmented cutting edges 122 of the first embodiment, each of the segmented cutting edges 322 includes an outer circumferential cutting edge, a pair of side cutting edges, a cutting face, an peripheral relief face, a back face, and a pair of side flank faces. A rake angle of the cutting face, an peripheral relief angle of the peripheral relief face, a back face angle of the back face, and a side relief angle of the side flank face are all within the angular ranges described in the first embodiment. Dimensional relationships between the respective cutting edge heights of the plurality of segmented cutting edges 322 constituting the cutting edge portion 320 are the same as the relationships described in the first embodiment. In addition, dimensional relationships between the respective cutting edge widths of the plurality of segmented cutting edges 322 constituting the cutting edge portion 320 are the same as the relationships described in the first embodiment. Dimensional relationships between the respective helix angles $\alpha$ of the plurality of segmented cutting edges 322 constituting the cutting edge portion 320 are the same as the relationships described in the first embodiment.

As described above, the base 310 of the present embodiment is constituted to include the plurality of segmented bases 311 which are separable from each other. Therefore, a positional relationship between the plurality of segmented bases 311 can be changed in the axial direction Da, and the positional relationship therebetween can be changed also in the circumferential direction with respect to the cutter center axis Ac. In the present embodiment, it is extremely important to accurately determine the positional relationship in the circumferential direction Dc between the plurality of segmented cutting edges 322 constituting the cutting edge portion 320 of the skiving cutter 300.

When the skiving cutter 300 is attached to the cutter arbor 10, first, the cutter attachment portion 12 of the cutter arbor 10 is inserted into each of the attachment holes 312 of the plurality of segmented bases 311. Next, mutual positional relationships in the circumferential direction between the plurality of segmented bases 311 are adjusted so that the pin holes 318 of the plurality of segmented bases 311 are linearly continuous. Then, the positioning pin 319 serving as a positioning member is inserted into each of the pin holes 318 of the plurality of segmented bases 311. As a result, in the present embodiment, it is possible to accurately determine the mutual positional relationships in the circumferential direction between the plurality of segmented cutting edges 322 constituting the cutting edge portion 320. Thereafter, the key 17 is inserted into the key space formed by the key grooves 313 of the plurality of segmented bases 311 and the key groove 13 of the cutter arbor 10. Then, a fixing nut 18 is screwed into the male screw 14 of the cutter arbor 10. As a result, the plurality of segmented bases 311 are interposed between the held portion 15 of the cutter arbor 10 and the fixing nut 18, and thus the mutual positional relationships are determined in the axial direction Da and the plurality of segmented bases 311 are fixed to the cutter arbor 10. Thereby, attachment of the skiving cutter 100 of the present embodiment to the cutter arbor 10 is completed.

As in the skiving cutter 100 of the first embodiment, also in the skiving cutter 300 of the present embodiment, since each of the coarse cutting edges 322b and 322c has a helix angle $\alpha$ different from a helix angle $\alpha$ of the finishing cutting edge 322a, the processing accuracy for a workpiece W can be enhanced and a service life of the skiving cutter 300 can be prolonged.

Also, as in the skiving cutter 200 of the second embodiment, since the segmented cutting edge 322 positioned furthest toward the attachment side Dab forms the finishing cutting edge (reference cutting edge) 322a, and the other segmented cutting edges 322 form the coarse cutting edges 322b and 322c, the skiving cutter 300 of the present embodiment allows all the segmented cutting edges 322 to contribute to the processing of the workpiece W.

Further, the base 310 of the skiving cutter 300 of the present embodiment is constituted by the segmented bases 311 that are separable from each other, and furthermore, among the plurality of segmented cutting edges 322 constituting one cutting edge portion 320, only one segmented cutting edge 322 is formed on one segmented base 311. Therefore, among the plurality of segmented cutting edges 322 constituting one cutting edge portion 320, it is possible to process one segmented cutting edge 322 without interfering with the other segmented cutting edges 322 constituting the cutting edge portion 320. Therefore, in the present embodiment, the segmented cutting edge 322 can be easily processed.

[Fourth Embodiment]

Figure 16:
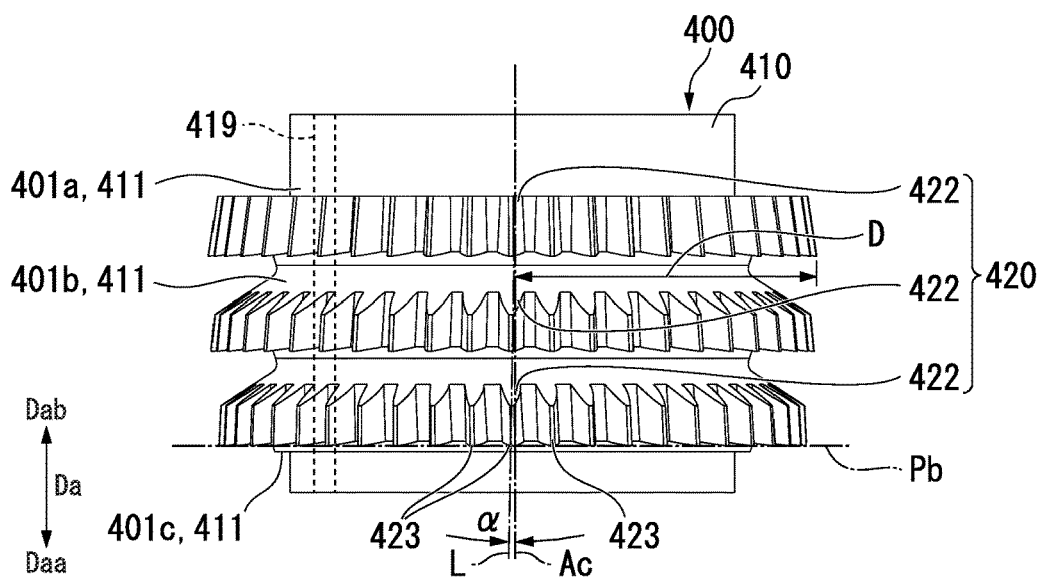
FIG. 16 is a side view of a skiving cutter in a fourth embodiment.

A fourth embodiment of a skiving cutter will be described with reference to FIG. 16.

A skiving cutter 400 of the present embodiment is basically the same as the skiving cutter 300 of the third embodiment. That is, the skiving cutter 400 of the present embodiment includes a finishing cutting edge cutter piece 401a, a first coarse cutting edge cutter piece 401b, a second coarse cutting edge cutter piece 401c, and a positioning pin 419. Each of the cutter pieces 401a, 401b, and 401c includes one segmented base 411 and a plurality of segmented cutting edges 422. The base 410 is constituted by three segmented bases 411. One cutting edge portion 420 is constituted by one segmented cutting edge 422 of the finishing cutting edge cutter piece 401a, one segmented cutting edge 422 of the first coarse cutting edge cutter piece 401b, and one segmented cutting edge 422 of the second coarse cutting edge cutter piece 401c. Parameters of the plurality of segmented cutting edges 422 constituting the cutting edge portion 420 are basically the same as the parameters of the segmented cutting edges in the above embodiments. However, a helix angle $\alpha$ of each of the segmented cutting edges 422 in the present embodiment is 10° or less, and an outer circumferential cutting edge 423 of each segmented cutting edge 422 is in a virtual plane Pb which is perpendicular to a cutter center axis Ac.

In each of the embodiments described above, the helix angle $\alpha$ of the segmented cutting edge has been larger than 10°. In this case, the outer circumferential cutting edge of the segmented cutting edge is in the virtual plane perpendicular to a tooth trace L. In the segmented cutting edge of the skiving cutter, a direction in which the tooth trace L extends is a cutting direction. Therefore, when the outer circumferential cutting edge is in the virtual plane perpendicular to the tooth trace L, that is, when the outer circumferential cutting edge extends in a direction perpendicular to the tooth trace L, cutting loads at portions on both sides of the outer circumferential cutting edge are made equal and an amount of wear at each position on the outer circumferential cutting edge can be made uniform.

The outer circumferential cutting edge 423 of the present embodiment is not within the virtual plane perpendicular to the tooth trace L. However, in a case in which the helix angle α of the segmented cutting edge 422 is 10° or less as in the present embodiment, although the outer circumferential cutting edge 423 is not within the virtual plane perpendicular to the cutter center axis Ac, this outer circumferential cutting edge 423 is in the virtual plane substantially perpendicular to the tooth trace L. Therefore, also in the present embodiment, cutting loads at portions on both sides of the outer circumferential cutting edge 423 are made substantially equal and an amount of wear at each position on the outer circumferential cutting edge 423 can be made substantially uniform. Further, in the present embodiment, the plurality of segmented cutting edges 422 formed on each of the cutter pieces 401a, 401b, and 401c have the same position as each other in an axial direction Da and the outer circumferential cutting edges 423 are in the virtual plane Pb perpendicular to the cutter center axis Ac. Therefore, the outer circumferential cutting edges 423 of the plurality of segmented cutting edges 422 formed on each of the cutter pieces 401a, 401b, and 401c are in one virtual plane Pb perpendicular to the cutter center axis Ac. Therefore, in the present embodiment, each of the outer circumferential cutting edges 423 of the plurality of segmented cutting edges 422 formed on each of the cutter pieces 401a, 401b, and 401c, and a cutting face which is continuous with the outer circumferential cutting edge 423 can be processed together with mutually adjacent segmented cutting edges 422 in the circumferential direction.

In the present embodiment and the third embodiment, one cutting edge portion includes three segmented cutting edges. In other words, in the present embodiment and the third embodiment, three cutter pieces are provided. However, the number of cutter pieces may be two, or four or more. Further, in the present embodiment and the third embodiment, a plurality of cutter pieces separable from each other are provided. However, in the present embodiment and the third embodiment, a plurality of cutter pieces may be an integral body and may have the same aspects as in the first embodiment and the second embodiment.

INDUSTRIAL APPLICABILITY

According to the skiving cutter of one aspect of the present invention, an internal gear can be precisely formed into a target shape and a service life of the skiving cutter can be prolonged.

REFERENCE SIGNS LIST 1 bed
2 column
3 saddle
4 head
5 slider
6 main spindle unit
7 rotary table
10 cutter arbor
12 cutter attachment portion
13 key groove
14 male screw
15 held portion
17 key
18 fixing nut
100, 200, 300, 400 skiving cutter
301a, 401a finishing cutting edge cutter piece
301b, 401b first coarse cutting edge cutter piece
301c, 401c second coarse cutting edge cutter piece
110, 210, 310, 410 base
311, 411 segmented base
112, 312 attachment hole
113, 313 key groove
318 pin hole
120, 220, 320, 420 cutting edge portion
121, 221, 321 cutting edge groove
122, 222, 322, 422 segmented cutting edge
122a, 222a, 322a finishing cutting edge
122b, 322b first coarse cutting edge
122c, 322c second coarse cutting edge
222b, 222c, 222d, 222e coarse cutting edge
123, 423 Outer circumferential cutting edge
124 Side cutting edge
125 cutting face
126 peripheral relief face
127 back face
128 side flank face
319, 419 positioning pin (positioning member)
L tooth trace
W workpiece
Lw tooth trace
Aa arbor center axis
Ac cutter center axis
Ah head center axis
Am main spindle rotation axis
At table rotation axis
Aw workpiece center axis
Da axial direction
Daa distal end side
Dab attachment side
θ1 rake angle
θ2 peripheral relief angle
θ3 back face angle
θ4 side relief angle
α helix angle

The invention claimed is:

1. A skiving cutter comprising:
a base having a circular cross-sectional shape perpendicular to an axis; and
a plurality of cutting edge portions protruding from an outer circumferential surface of the base, formed at intervals in a circumferential direction with respect to the axis, and having a tooth trace extending in a direction inclined with respect to the axis, wherein
each of the cutting edge portions is segmented into a plurality of segmented cutting edges by cutting edge grooves extending in a direction intersecting the tooth trace,
each of the segmented cutting edges includes an outer circumferential cutting edge which is an edge farthest away from the base among portions forming the segmented cutting edge,
one of the plurality of segmented cutting edges constituting the cutting edge portion forms a reference cutting edge, and the reference cutting edge has the largest axis-cutting edge distance which is a distance from the axis to the outer circumferential cutting edge and the remaining one or more segmented cutting edges have gradually smaller axis-cutting edge distances as a distance from the reference cutting edge to each of the remaining segmented cutting edges increases, and a helix angle which is an angle of the tooth trace with respect to the axis is different according to a position in the axial direction of the plurality of segmented cutting edges constituting the cutting edge portion.

2. The skiving cutter according to claim 1, wherein helix angles of one or more segmented cutting edges excluding the reference cutting edge among the plurality of segmented cutting edges constituting the cutting edge portion increase in variation amount with respect to the helix angle of the reference cutting edge as a distance from the reference cutting edge to each of the segmented cutting edges increases.

3. The skiving cutter according to claim 1, wherein helix angles of one or more segmented cutting edges excluding the reference cutting edge among the plurality of segmented cutting edges constituting the cutting edge portion increase as a distance from the reference cutting edge to each of the segmented cutting edges increases.

4. The skiving cutter according to claim 1, wherein cutting edge heights of the plurality of segmented cutting edges constituting the cutting edge portion are formed such that:
the cutting edge height at the reference cutting edge is the highest; and
the cutting edge height at one segmented cutting edge which is more distant from the reference cutting edge between two segmented cutting edges adjacent to each other in a tooth trace direction in which the tooth trace extends is equal to or less than the cutting edge height of the other segmented cutting edge.

5. The skiving cutter according to claim 1, wherein cutting edge widths of the plurality of segmented cutting edges constituting the cutting edge portion are formed such that:
the cutting edge width at the reference cutting edge is the largest; and
the cutting edge width at one segmented cutting edge which is more distant from the reference cutting edge between the two segmented cutting edges adjacent to each other in the tooth trace direction in which the tooth trace extends is equal to or less than the cutting edge width of the other segmented cutting edge.

6. The skiving cutter according to claim 1, wherein the segmented cutting edge includes:
a cutting face extending from the outer circumferential cutting edge toward the base;
a peripheral relief face extending from the outer circumferential cutting edge in a direction along the tooth trace; and
a back face extending from an end opposite to the outer circumferential cutting edge on the peripheral relief face toward the base, and
a rake angle which is an angle of the cutting face with respect to a virtual plane perpendicular to the tooth trace is 0° or more and 20° or less.

7. The skiving cutter according to claim 6, wherein a back face angle which is an angle of the back face with respect to a virtual plane perpendicular to the tooth trace is 10° or more and 50° or less.

8. The skiving cutter according to claim 6, wherein a peripheral relief angle which is an angle of the peripheral relief face with respect to the tooth trace is more than 0° and 12° or less.

9. The skiving cutter according to claim 1, wherein the outer circumferential cutting edge of the segmented cutting edge having a helix angle of 10° or less is in a virtual plane perpendicular to the axis.

10. The skiving cutter according to claim 1, wherein
the outer circumferential cutting edge of the segmented cutting edge having the helix angle α larger than 10° is in a virtual plane perpendicular to the tooth trace.

11. The skiving cutter according to claim 1, comprising
a plurality of cutter pieces arranged in the axial direction, wherein
each of the cutter pieces includes:
a segmented cutting edge row which is a collection of a plurality of segmented cutting edges having the same position in the axial direction as each other and arranged in the circumferential direction among the segmented cutting edges constituting each of the plurality of cutting edge portions; and
a segmented base formed as a portion of the base and including the segmented cutting edge row formed on an outer circumference thereof, and
the segmented bases are separable from each other, and
the skiving cutter further comprising:
a positioning member which determines relative positions in the circumferential direction of the segmented cutting edges between the plurality of cutter pieces.

* * * * *